(12) United States Patent
Varges et al.

(10) Patent No.: US 11,620,994 B2
(45) Date of Patent: Apr. 4, 2023

(54) METHOD FOR OPERATING AND/OR CONTROLLING A DIALOG SYSTEM

(71) Applicant: Volkswagen Aktiengesellschaft, Wolfsburg (DE)

(72) Inventors: Sebastian Varges, Berlin (DE); Spyros Kousidis, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 241 days.

(21) Appl. No.: 16/781,167

(22) Filed: Feb. 4, 2020

(65) Prior Publication Data

US 2020/0251109 A1    Aug. 6, 2020

(30) Foreign Application Priority Data

Feb. 4, 2019   (DE) .................... 10 2019 201 413.5

(51) Int. Cl.
*G10L 15/22*   (2006.01)
*G10L 15/30*   (2013.01)
*G10L 13/00*   (2006.01)

(52) U.S. Cl.
CPC .............. *G10L 15/22* (2013.01); *G10L 13/00* (2013.01); *G10L 15/30* (2013.01); *G10L 2015/223* (2013.01)

(58) Field of Classification Search
USPC .................... 704/246, 247, 251, 252, 275
See application file for complete search history.

(56) References Cited

U.S. PATENT DOCUMENTS

| 9,412,374 B2 | 8/2016 | Gruchalski et al. | |
|---|---|---|---|
| 9,691,390 B2 | 6/2017 | Stonehocker et al. | |
| 10,056,079 B2 | 8/2018 | Matsumoto et al. | |
| 2002/0072905 A1 | 6/2002 | White et al. | 704/231 |
| 2004/0068370 A1 | 4/2004 | Moody et al. | 701/469 |

(Continued)

FOREIGN PATENT DOCUMENTS

| DE | 102016003903 A1 | 9/2016 | B60R 16/02 |
|---|---|---|---|
| DE | 102015212650 A1 | 1/2017 | G10L 15/30 |

(Continued)

OTHER PUBLICATIONS

German Office Action, Application No. 102019201413.5, 5 pages.

*Primary Examiner* — Leonard Saint-Cyr
(74) *Attorney, Agent, or Firm* — Slayden Grubert Beard PLLC (57) ABSTRACT

The invention relates to a method for operating and a method for controlling a dialog system, wherein the dialog system comprises a local dialog unit for detecting dialog inputs and for outputting dialog outputs as well as an external dialog unit having a data connection to the local dialog unit for analyzing detected dialog inputs and determining dialog outputs based thereon. At least one probable future course of dialog consisting of dialog inputs and/or dialog outputs is calculated and transmitted to the local dialog unit by the external dialog unit. Said course of dialog is received and saved by the local dialog unit. The saved course of dialog is called up in the event of an interruption to the data connection between the local dialog unit and the external dialog unit. Dialog inputs are detected and/or dialog outputs are output based on the called-up course of dialog.

19 Claims, 4 Drawing Sheets

(56) References Cited

U.S. PATENT DOCUMENTS

| | | | | |
|---|---|---|---|---|
| 2006/0235684 | A1 | 10/2006 | Chang | 704/233 |
| 2013/0078911 | A1* | 3/2013 | Levien | H04W 4/18 |
| | | | | 455/39 |
| 2013/0079052 | A1* | 3/2013 | Levien | G06Q 10/10 |
| | | | | 455/552.1 |
| 2013/0079053 | A1* | 3/2013 | Levien | H04W 4/18 |
| | | | | 455/552.1 |
| 2013/0080519 | A1* | 3/2013 | Levien | H04L 51/24 |
| | | | | 709/204 |
| 2013/0080961 | A1* | 3/2013 | Levien | G06Q 10/10 |
| | | | | 715/773 |
| 2013/0109302 | A1* | 5/2013 | Levien | H04M 7/0024 |
| | | | | 455/39 |
| 2013/0283181 | A1* | 10/2013 | Mazzaferri | G06F 9/542 |
| | | | | 715/740 |
| 2016/0132342 | A1 | 5/2016 | Yang et al. | 715/708 |
| 2016/0283494 | A1* | 9/2016 | Krishnaswamy | G06F 16/3334 |
| 2020/0302926 | A1* | 9/2020 | Aggarwal | G10L 15/22 |

FOREIGN PATENT DOCUMENTS

| | | | | |
|---|---|---|---|---|
| DE | 102015226408 | A1 | 6/2017 | G10L 15/22 |
| EP | 1341363 | B1 | 9/2003 | G01C 21/00 |
| EP | 2909833 | B1 | 7/2016 | B60R 16/037 |

* cited by examiner

METHOD FOR OPERATING AND/OR CONTROLLING A DIALOG SYSTEM

CROSS-REFERENCE TO RELATED APPLICATIONS

This application claims priority to German Patent Application No. DE 10 2019 201 413.5, filed on Feb. 4, 2019 with the German Patent and Trademark Office. The contents of the aforesaid Patent Application are incorporated herein for all purposes.

TECHNICAL FIELD

The present invention relates to a method for operating a dialog system and to a method for controlling a dialog system. The invention further relates to a system in which such a method according to the invention is used.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Dialog systems enable a user to communicate with an automated system, wherein the inputs and outputs can be made in a wide variety of ways, for example by means of text, speech, graphics or gestures.

This way, users can conduct partially or fully automated dialog in largely natural language with spoken dialog systems via a speech interface. Spoken dialog systems of this kind have been known for a long time from the telecommunications industry, for example. In applications of this kind, the speech processing is entirely carried out by a computer system of the service provider.

The situation is similar for speech-controlled assistance systems, for example, which are integrated into loudspeakers connected to the Internet for playing back music, and also for applications in consumer electronics, which process speech overwhelmingly by means of computer systems of the provider of the intelligent personal assistant. This way, high-quality recognition and interpretation of a spoken input of the user is ensured, since the high computing power required for this does not have to be provided in the terminal device but rather can be provided by the provider. Limited speech recognition is carried out by a user device solely in order to activate the speech processing.

Spoken dialog systems are also increasingly being used in the automobile industry. By means of these systems, destination information can be input and navigation instructions can be output via speech in navigation systems, and in infotainment systems media can be selected or an integrated telephone function can be operated, for example. These spoken dialog systems usually run in a locally embedded manner in the motor vehicle (embedded system) and are therefore always available. However, such systems that operate in an entirely local manner have a series of disadvantages such as, in particular, inferior speech recognition, complicated software updates, few opportunities to optimize the system behavior or to learn from many systems at the same time.

In addition, there are also approaches for using purely online speech systems in a car. This way, mobile devices can be coupled to the infotainment system of the vehicle in order to operate said mobile devices via speech, the spoken input and output taking place in the motor vehicle but the speech processing taking place externally. Although purely online-based systems do not have the disadvantages of embedded systems, they suffer from the known problems of connection interruptions and inadequate network availability.

When using spoken dialog systems in a motor vehicle, maximum possible reliability is desirable such that the driver of the motor vehicle is not unnecessarily distracted by malfunctions but rather can dedicate their attention to the task of driving. For this reason, there are also approaches involving so-called hybrid spoken dialog systems, in which the speech processing is carried out in a partially locally embedded manner in the motor vehicle and partially carried out by means of an external computer system in the so-called cloud.

EP 2 909 833 B1, for example, describes a method for recognizing speech in a motor vehicle. Spoken inputs of a user are fed to a vehicle-internal on-board speech recognition system and to a vehicle-external off-board speech recognition system. The spoken text is then determined depending on the recognition results of the speech recognition systems. The method does not rely on all spoken inputs always being processed by both the on-board speech recognizer and the off-board speech recognizer. Rather, the method provides fully on-board speech recognition, fully off-board speech recognition, sequential speech recognition and parallel speech recognition. One of these modes is selected depending on a control parameter. If, for example, there is no wireless connection from the motor vehicle to a data network via which the off-board speech recognizer can be reached, recognition can still be carried out using the on-board speech recognition system.

Furthermore, DE 10 2016 003 903 A1 discloses a method for recognizing speech in a motor vehicle, speech recognition results being generated from a spoken input made by a user and syntactically/semantically interpreted by means of a vehicle-internal speech recognition apparatus, an unrecognized portion of the spoken input being completed in a vehicle-external speech recognition apparatus in consideration of the syntactic/semantic interpretation.

Another alternative hybrid architecture for spoken dialog systems is described in DE 10 2015 212 650 A1. In this case, the partial steps of a spoken dialog system are executed in a fully parallel manner both in a locally embedded manner as well as online on an external computer system. After each partial step, both partial results are awaited at a coordination point, and then the next partial step is initiated in parallel.

SUMMARY

An object of the present invention is to specify an improved method for operating and/or controlling a dialog system that can in particular be used in a motor vehicle.

This object is solved by a method for operating a dialog system and by a method for controlling a dialog system according to the independent claims. Embodiments of the invention are discussed in the dependent claims and the following description.

In one exemplary aspect, a method is provided for operating a dialog system, the dialog system comprising a local dialog unit for detecting dialog inputs and for outputting dialog outputs as well as an external dialog unit having a data connection to the local dialog unit for analyzing detected dialog inputs and determining dialog outputs based thereon, the following steps being carried out by the local dialog unit:

receiving at least one probable future course of dialog that is calculated by the external dialog unit and consists of one or more of dialog inputs and dialog outputs;

saving the received course of dialog;

retrieving the saved course of dialog in the event of an interruption to the data connection between the local dialog unit and the external dialog unit; and one or more of detecting dialog inputs and outputting dialog outputs based on the retrieved course of dialog.

The details of one or more embodiments are set forth in the accompanying drawings and the description below. Other features will be apparent from the description, drawings, and from the claims.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

As discussed in the preceding and in one exemplary aspect, a method is provided for operating a dialog system, the dialog system comprising a local dialog unit for detecting dialog inputs and for outputting dialog outputs as well as an external dialog unit having a data connection to the local dialog unit for analyzing detected dialog inputs and determining dialog outputs based thereon, the following steps being carried out by the local dialog unit:

receiving at least one probable future course of dialog that is calculated by the external dialog unit and consists of one or more of dialog inputs and dialog outputs;

saving the received course of dialog;

retrieving/calling up the saved course of dialog in the event of an interruption to the data connection between the local dialog unit and the external dialog unit; and one or more of detecting dialog inputs and outputting dialog outputs based on the retrieved/called up course of dialog.

According to the first aspect, a dialog can be conducted if the connection to an online dialog system is interrupted. At the same time, the benefits of dialog input processing, in particular dialog inputs in the form of spoken inputs, by means of an external computer system in the cloud, for example simple update options, are preserved. Another benefit over the hybrid architecture disclosed in DE 10 2015 212 650 A1 is that no technically burdensome coordination that slows down execution needs to take place, the architecture proposed herein being able to cope with a single dialog manager instead of requiring one local and one external dialog manager in each case.

In some embodiments, the following steps are additionally carried out by the local dialog unit:

detecting a dialog input of a user;

transmitting the detected dialog input to the external dialog unit.

This makes it possible to take into consideration the previously conducted dialog for the future course of dialog calculated by the external dialog unit.

In some embodiments, in the method, in an online mode, a dialog output generated by the external dialog unit is received and output based on the dialog input detected by the local dialog unit and transmitted to the external dialog unit, and in an offline mode, the probable future course of dialog received from the external dialog unit and saved is retrieved/called up in the local dialog unit.

The course of dialog received from the external dialog unit may in some embodiments be a probable continuation of the previous dialog for the detected dialog input, the previous dialog being continued based on said course of dialog.

This ensures that ongoing dialogs do not have to be interrupted, but rather can be continued in an appropriate manner.

In some embodiments, the course of dialog is received before a dialog has been initiated.

This way, a dialog can be conducted even if same had not yet been initiated prior to an interruption to the connection.

In some embodiments, updated versions of the probable future course of dialog are received from the external dialog unit and saved in the local dialog unit at regular time intervals.

Equally, a probable future course of dialog can for example be retrieved/called up from the external dialog unit and saved in the local dialog unit when an interruption to the connection is anticipated.

In another aspect, a method is provided for controlling a dialog system, the dialog system comprising a local dialog unit for detecting dialog inputs and for outputting dialog outputs as well as an external dialog unit having a data connection to the local dialog unit for analyzing detected dialog inputs and determining dialog outputs based thereon, the following steps being carried out by the external dialog unit:

calculating at least one probable future course of dialog that consists of dialog inputs and/or dialog outputs; and transmitting the calculated course of dialog to the local dialog unit.

In some embodiments, the following step is additionally carried out in the external dialog unit:

receiving a detected dialog input from the local dialog unit;

the calculation of the course of dialog based on the received dialog input and the course of dialog being a probable continuation of the previous dialog.

In some embodiments, the course of dialog is calculated before a dialog has been initiated.

In some embodiments, the course of dialog is calculated based on one or more of the following parameters:

the current location of the local dialog unit, the current local time of the local dialog unit, information on current political, economic, social, cultural, sports or other events, information typically requested by the user, and information requested by other users.

The dialog system may in some embodiments be designed as a spoken dialog system, in which dialog inputs are performed by means of speech recognition and interpretation of spoken inputs of a user and/or dialog outputs are performed by means of speech synthesis.

In some embodiments, the calculated course of dialog, in addition to a probable continuation of the previous dialog for a recognized dialog input, also comprises a probable continuation of the previous dialog for a phonetically similar dialog input.

In some embodiments, in the method according to the present aspect, the local dialog unit is implemented in a vehicle and the external dialog unit is implemented in a vehicle-external server, which vehicle and server are connected via the Internet.

The calculated course of dialog may for example be in the form of a hierarchical tree structure.

In another aspect, a system is provided for operating and controlling a dialog system, the dialog system comprising a local dialog unit for detecting dialog inputs and for outputting dialog outputs as well as an external dialog unit having a data connection to the local dialog unit for analyzing detected dialog inputs and determining dialog outputs based thereon, the system being configured to carry out a method according to any aspect, embodiment, or combination thereof discussed herein.

Other features and embodiments will become apparent from the following description and the claims in conjunction with the FIGS.

In order to better understand the principles of the present invention, further embodiments are explained in greater detail below based on the FIGS. It should be understood that the invention is not limited to these embodiments and the features described may also be combined or modified without departing from the scope as defined in the claims.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
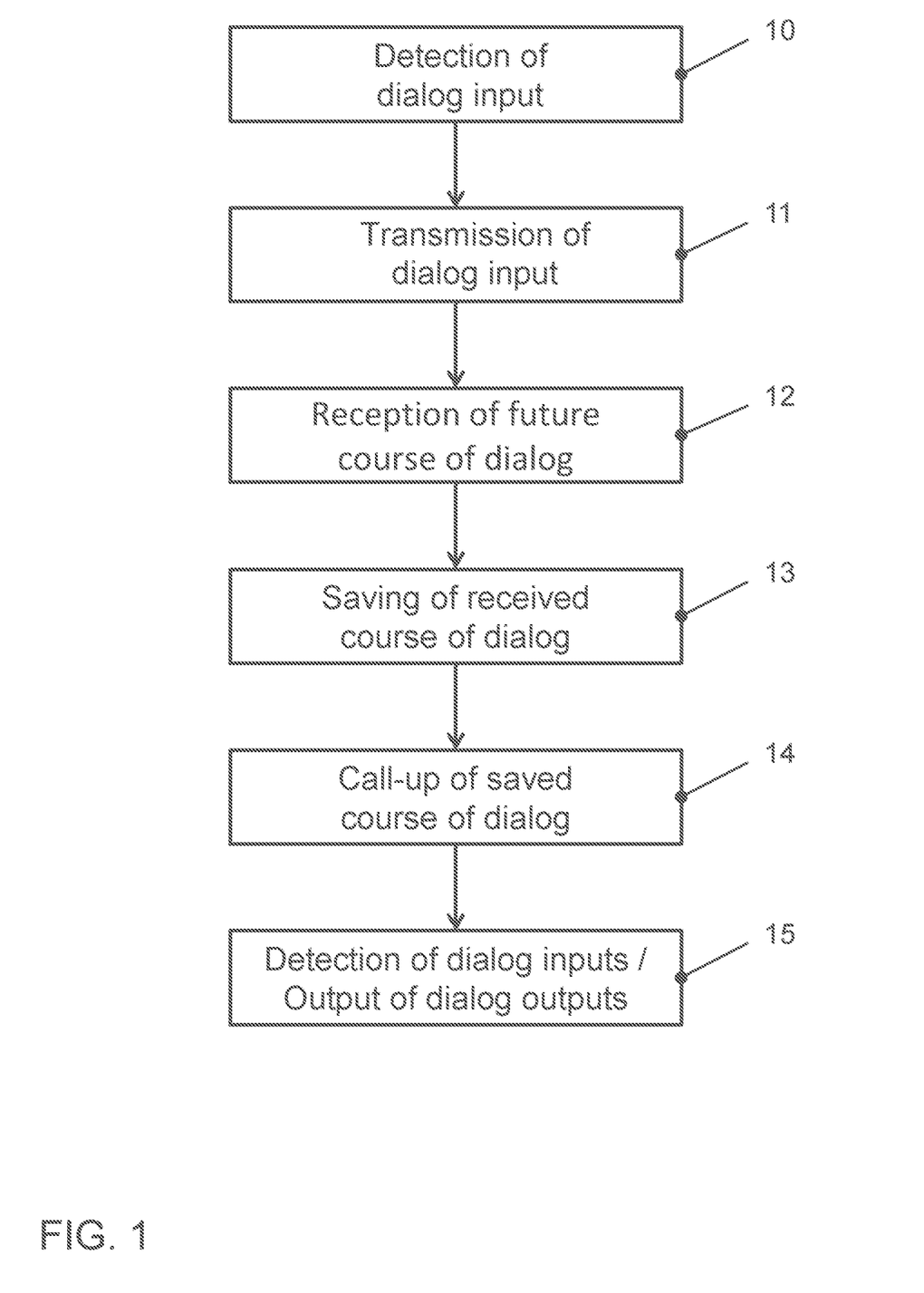
FIG. 1 schematically shows a flow chart for a method for operating a dialog system based on a probable future course of dialog.

FIG. 1 schematically shows a method for operating a dialog system based on a probable future course of dialog. The method is carried out by the local dialog unit, which may in particular be embedded in a motor vehicle. The dialog is controlled by means of a dialog manager, which is located in the so-called cloud in the case of an external dialog unit, in particular an external computer system.

In a first step 10, a dialog input of a user is detected. The dialog input may be performed in various ways depending on the user interface used. Inputs may therefore be performed, for example, by means of a mechanical operating element in order to select one of a plurality of options shown on a display, or by means of gestures, but in particular by means of spoken input.

In a subsequent step 11, the dialog input is then transmitted to an external dialog unit, if applicable after signal processing, recognition and interpretation steps not shown here. The transmission may in particular take place by means of wireless communication technology, for example via a mobile network as per the mobile communication standards 4G or 5G.

The dialog input is then analyzed by means of the dialog manager in the external dialog unit. In an online mode, the dialog manager controls the further dialog based on the dialog inputs detected by the local dialog unit and transmitted to the external dialog unit and also generates suitable dialog outputs, such as responses to search queries of the user, which are transmitted to a local dialog unit, where they are output. In the online mode, updates to the prediction of the future course of dialog can be sent to the internal dialog unit together with the system response to each user input. This is beneficially the standard case for an available online connection.

According to the present embodiment, probable future courses of dialog are additionally calculated by means of a dialog predictor in the external dialog unit for a potential offline mode of the local dialog unit, which may occur due to an interruption to the connection between the local and external dialog unit.

The dialog predictor may be integrated into the dialog manager, but it may also be separately provided in the external dialog unit and then cooperate with the dialog manager in order to predict future user inputs and system reactions and to proactively send said information to the local dialog unit.

The probable future courses of dialog may in particular be a continuation of an ongoing dialog. One or more of said probable future courses of dialog are transmitted by the external dialog unit to the local dialog unit and received thereby in a step 12.

Equally, however, the course of a dialog that has not yet been initiated and that is considered to be probable based on various parameters that will be explained in greater detail below may also be received by the local dialog unit. In this case, the previous steps 10 and 11 are optional.

The probable future course of dialog received from the external dialog unit is then saved in a memory of the local dialog unit in a step 13. This course of dialog does not need to be accessed, provided that there is a data connection between the local dialog unit and the external dialog unit. Instead, suitable subsequent dialog steps are called up from the external dialog unit online in response to dialog inputs of the user, since in this way it is ensured that the dialog is continued correctly.

If, however, the data connection between the local dialog unit and the external dialog unit is then interrupted, for example because the required mobile connection is not locally available or if said connection is periodically interrupted on account of technical problems, in a step 14, the saved course of dialog is called up from the memory.

Subsequently, in step 15, further dialog inputs are input and/or dialog outputs are output based on the called-up course of dialog. The course of dialog may comprise a plurality of dialog steps. This produces a hierarchical tree structure of the dialog steps, since there are often several options for operating functions and search queries.

If the data connection between the local dialog unit and the external dialog unit is then restored, the dialog system reverts back to the online mode.

Furthermore, the dialog system transmits the course of the dialog conducted locally in the offline mode to the external dialog unit, such that said unit can improve its prediction ("data mining").

Figure 2:
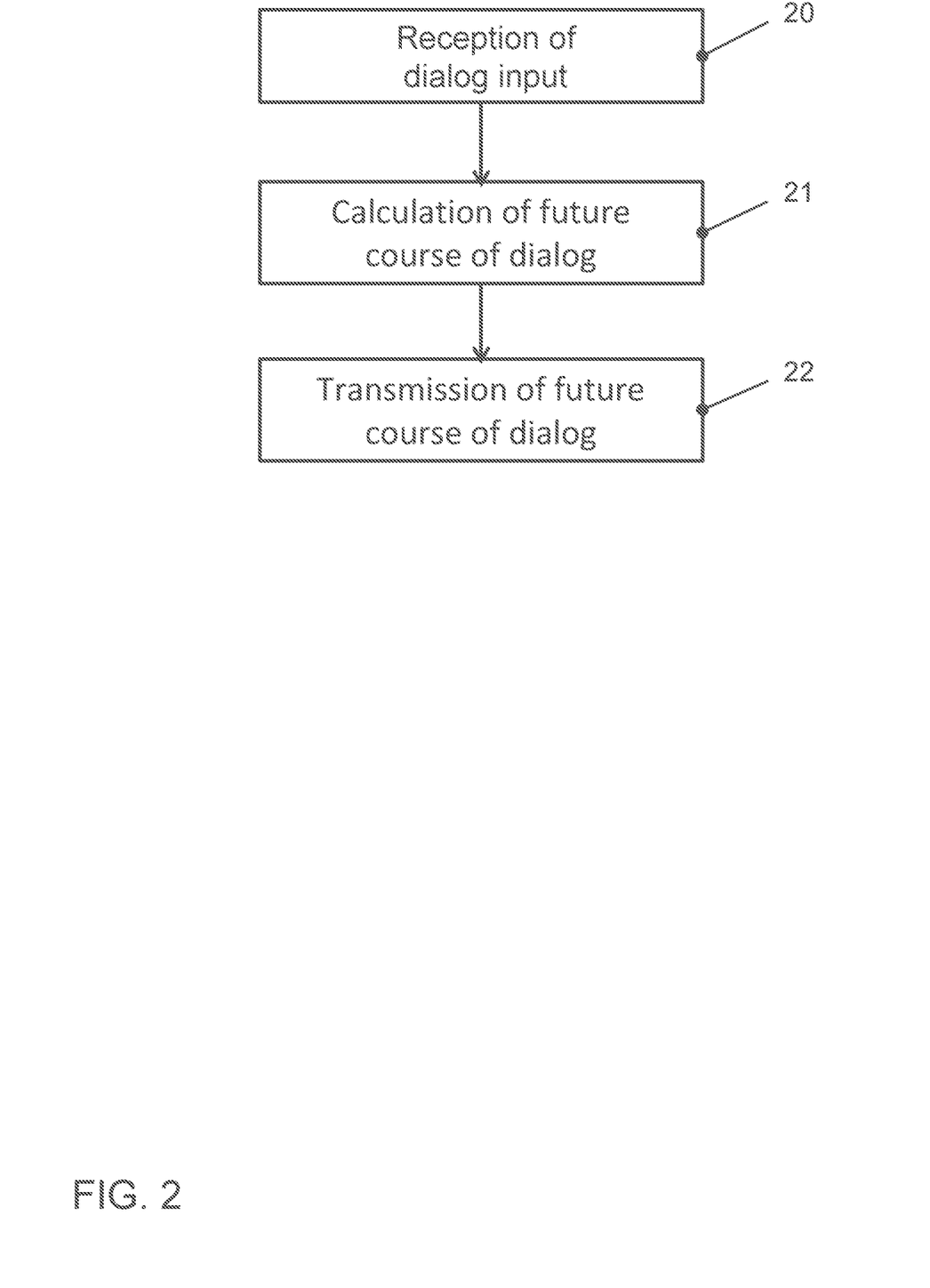
FIG. 2 schematically shows a flow chart for a method for controlling a dialog system by means of calculating a probable future course of dialog.

The method, carried out by the external dialog unit, for controlling the dialog system by means of calculating a probable future course of dialog is shown schematically in FIG. 2.

Firstly, a dialog input of a user is received in step 20. Dialog outputs suitable for current received dialog inputs are then generated in the external dialog unit by means of the dialog manager and transmitted to the local dialog unit for playback in the online mode.

In addition, in step 21, at least one probable future course of dialog consisting of dialog inputs and/or dialog outputs is calculated for a potential interruption to the data connection.

Dialog models defined in advance may be used for this purpose. This in particular lends itself to courses of dialog with only few possible options. For courses of dialog with a large number of possible options, for example search queries of the user, the dialog models may be determined for example by means of an artificial neural network, which learns the probabilities of typical courses of dialog or search queries. In order to train the neural network, past courses of dialog of the relevant user or of a large number of users can be supplied thereto. This way, the neural network is always optimized further and an ever more accurate prediction of a future course of dialog of the user is made possible.

This way, the dialog steps likely to follow on from the most recently received dialog input can in particular be determined. However, instead of a current dialog being continued in this manner, a probable course of dialog can also be calculated prior to initiation of a dialog. Various external parameters can be used for this purpose.

Since, for example, information on so-called points of interest POIs in the vicinity of a user are frequently requested by said user, the current location of the local dialog unit may be evaluated in order to provide possible queries on the current points of interest. For this purpose, the location information may for example be determined by a GPS sensor integrated in the local dialog unit and transmitted to the external dialog unit. Equally, said location information may for example be determined from a cell in which the local dialog unit is located at the current point in time.

Equally, probable courses of dialog may for example also be based on the current local time of the local dialog unit, information on current political, economic, social, cultural, sports or other events, information typically requested by the user or information requested by other users.

Equally, several of these parameters may be considered at the same time in order to allow for as accurate a dialog prediction as possible. If, for example, there is information for a large number of users as to which dialog inputs or search requests said users have made at a particular location and at a particular time of day in the past, one or more probable courses of dialog can be predicted based on this information for a user who is at said location at the same time of day.

One or more calculated, probable future courses of dialog are then transmitted from the external dialog unit to the local dialog unit in step 22. The transmission requires an existing connection between the external dialog unit and the local dialog unit and may take place at regular time intervals, older versions of the course of dialog being replaced with updated versions.

Equally, the transmission may alternatively or additionally take place when an interruption to the connection is anticipated. For example, in a local dialog unit implemented in a motor vehicle, it can be determined based on the current GPS coordinates of the vehicle and digital map material for the current vehicle surroundings that the vehicle will soon enter a relatively long tunnel and that the connection will likely be interrupted. In this case, the vehicle can call up a probable future course of dialog from the external dialog unit within a suitable time frame prior to entering the tunnel.

In the process, predictive dialog continuations for an ongoing dialog as well as simple dialogs for other topics may be sent to the local dialog unit. This way, an adequate reaction can be produced in both cases in the event of insufficient network availability, an interruption of ongoing dialogs being prevented on the one hand and, on the other hand, it being possible to output more meaningful or more useful messages than for example "Service not available" or "I can't do that at the moment" to the user.

Figure 3:
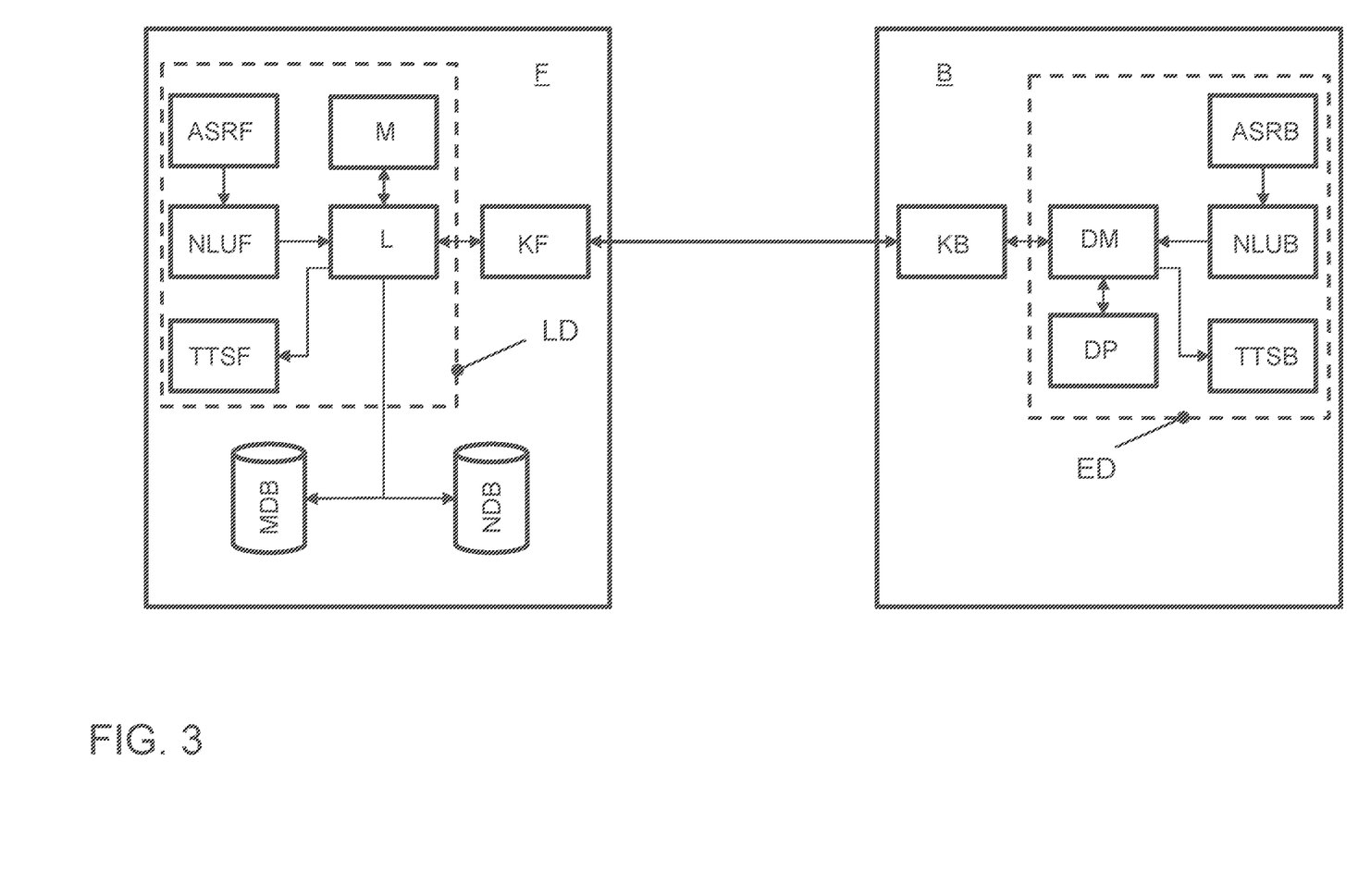
FIG. 3 schematically shows a system for operating and controlling a dialog system.

FIG. 3 schematically shows a system for operating and controlling a spoken dialog system, which comprises a local dialog unit LD in a front end F and an external dialog unit ED in a back end B.

The front end F may in particular be integrated in a motor vehicle as part of an infotainment system and, in addition to the local dialog unit, comprise various infotainment components such as a local media database MDB and a navigation database NDB. Additionally, a communication unit KF that establishes a wireless connection to a back end in the form of an online server is provided in the front end.

The local dialog unit, in addition to a local logic unit L, comprises a speech recognition unit ASRF (automatic speech recognition ASR), a speech comprehension unit NLUF (natural language understanding NLU) and a speech synthesis unit TTSF (text-to-speech synthesizer TTS).

The local logic unit L provides for synchronization with the arranged dialog manager, output of dialog outputs or execution of corresponding commands and provides for switching between an online mode and an offline mode, depending on whether or not there is a data connection to the back end. The speech recognition unit ASRF converts a sequence of feature vectors into a sequence of words, the meaning of which is then determined by means of semantic interpretation in the speech comprehension unit NLUF. Since the courses of dialog frequently relate to requests for information on executing an action, for example searching through a media database in order to play back a piece of music, the intent behind the spoken input of the user must be determined. After said intent has been determined, slots that more precisely specify the intended request or action are extracted from the spoken input.

Additionally, separate signal processing (not shown in the figures) may be provided for converting the speech signals detected by one or more microphones into feature vectors. However, said signal processing may also be integrated in the automatic speech recognition unit. Because the local dialog unit comprises a local speech recognition unit and a local speech comprehension unit, it is ensured that spoken inputs can further be processed even in the event of an interruption to the connection to the back end.

The speech synthesis unit TTS serves to generate dialog outputs in the form of artificial spoken outputs from locally available word sequences or word sequences received from the back end. Moreover, a memory unit M is provided, in which the dialog predictions received from the back end are stored, among other things.

The back end comprises a dialog manager DM and a dialog predictor DP, by means of which dialogs are controlled in an online mode and future courses of dialog are predicted. A communication unit KB corresponding to the communication unit KF in the front end is provided in the back end for the connection to the front end. Furthermore, a speech recognition unit ASRB, a speech comprehension unit NLUB and/or a speech synthesis unit TTSB may also be provided in the back end. These may have more comprehensive functionalities in comparison with the corresponding components in the front end on account of the high computing power and memory capacity available on the online server.

A back end system of this kind may for example be put together or provided by a vehicle manufacturer for the motor vehicles manufactured and sold for said vehicle manufacturer.

For illustrative purposes, examples in which the local dialog unit is integrated in a motor vehicle will be given in the following. The driver of the motor vehicle is searching for music in their local music collection and a response list is already being displayed to them on a display of the infotainment unit.

Possible dialog continuations include, for example:
a) "Play row 2" (a generic input),
b) "Play the album" (not generic, as it depends on the search result), or
c) "No, I meant $ArtistLocalDB" (generic, because it contains a variable for the artist in the local music collection).

The dialog continuations must also either contain the necessary fillers for the slots of the carrier sets in the speech comprehension unit ("Album" in (b)) or be locally filled (in (a) and (c)), such that they can be understood by the speech comprehension unit in the motor vehicle. The fillers are then loaded onto the local speech comprehension unit prior to recognition. For cases where the user makes an input for playing back music, other possible continuations may for example relate to stopping, skipping or pausing the music output.

For cases where a new search is started with "No, I meant . . . ", the predictive dialog manager could send other dialog continuations, e.g.
d) "No, I meant Michael Headson"

Such a variant could be based on the phonetic similarity to the original request, i.e. it would not be generic and could be based on typical confusions identified in the cloud. In contrast to the local artists (c), who are present in any case, the case that "Michael Headson" is not present must also be provided as a continuation of (d).

In addition, the actual dialog management logic and the possible sets of responses must also be sent by the external dialog unit to the local dialog unit for the input examples mentioned above. The dialog management logic of a dialog step may then contain specific conditions, for example that the name "Michael Headson" is present in the local database. As with the input sets (a-d), the possible sets of responses that replace a more complex local speech generation component again contain a mixture of variables for specific names, etc., for example:
e) "Here are all songs by $ArtistLocalDB in your music collection" (generic continuation of (c)).
f) "Sorry, I can't find anything by Michael Headson in your music collection, and I can't search online at the moment." (A continuation of (d) with the condition that "Michael Headson" is not contained in the local music collection).

The following example is intended to further illustrate the transition from an online mode to an offline mode. The system S is initially in the online mode, the user N inputting the following spoken command:
(1) N: "Play something by Michael Jackson".

The command to play music can be recognized by both the local dialog unit and the external dialog unit. The name of the artist can also be recognized by both the local and the external dialog unit, in particular if pieces of music by the artist are present on the local media database. However, it is also possible for the local dialog unit to merely be able to recognize the command and not the name of the artist. In this case, however, the artist's name can be recognized by the external dialog unit in the online mode.

After the desired media playback has been recognized by the dialog manager in the external dialog unit, the user is invited, by means of spoken output or display on a graphical user interface, to select one of a plurality of alternatives:
(2) S: "Please select one of the following options."

In addition, the available alternatives are presented on the graphical user interface either from the local media database or from proposals of online media content service providers:
1. Michael Jackson—Thriller
2. Michael Jackson—Best of Compilation
3. Michael Jackson—Stream from MusicStreamer.com The user may respond to this in a variety of ways, for example:
(3) N: "Play song"/"Play album/online"
or:
(4) N: "Row 2"
or:
(5) N: "No, I meant Michael Headson".

The latter input discards all three proposed options and inputs the original request again, the slot ARTIST NAME now bearing the new artist's name ("Michael Headson").

Similar dialogs can also be found in other domains, for example in navigation, for example if the user is searching for points of interest POIs that may or may not be present in the embedded database. On account of the large number of possible POIs, embedded speech systems generally have only limited options for finding said POIs, in contrast to online systems, which are capable of finding nearly all POIs.

Figure 4:
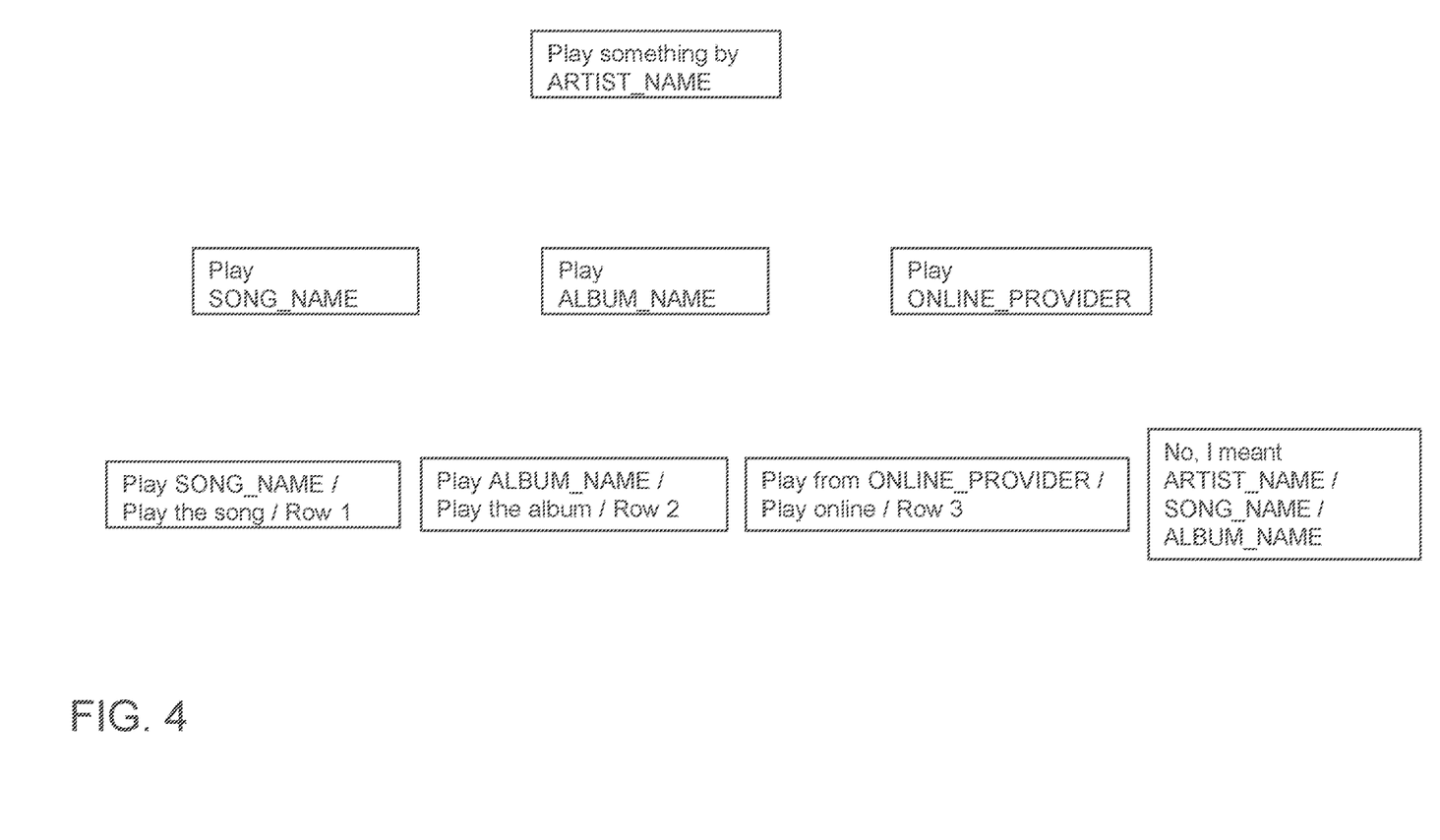
FIG. 4 shows an example of a hierarchical tree structure of a course of dialog for playing back media.

In order to prepare for an interruption to a connection during an ongoing dialog, the dialog predictor produces a hierarchical data structure of a course of dialog in the back end in the form of one or more branching "trees", which cover the dialog states for the most probable future dialog scenarios. The dialog continuations should be understood to mean instantiations of a general dialog manager, i.e. no generic code, for example, is sent to the local dialog unit, but rather specific implementations for the currently conducted dialog, including proper names, for example. An example of the above-mentioned dialog is shown in FIG. 4.

The dialog predictor can also generate dialog continuations for misunderstood user intent, for example in case that the user did not want to listen to music, but this was wrongly interpreted by the speech recognition unit. Equally, additional dialog continuations may be generated for misunderstood slots, for example an incorrectly recognized artist name. In the example given above, the dialog predictor would also search for artists that are similar to "Michael Jackson" or for user intents that are more frequently confused with "Play music" and that generate branches for both.

As a result, and in particular also for complex topics or a large number of topics taken into consideration and a large number of dialog steps or hierarchies, the tree structure generated may be very extensive. It is therefore also possible to transmit only the dialog continuation that is statistically most probable (also referred to as "happy path") to the local dialog unit, instead of the entire tree structure containing all possible dialog states.

The dialog tree structures and respective entities, for example media, POIs, addresses for navigation, etc., may also be separate. The back end can enrich the embedded databases of the front end with additional probable content, whereas the tree structures are generic and only contain entity types as opposed to explicit information.

Although it may be necessary for the dialog predictor to limit its search area, in particular on account of a limited connection bandwidth and memory capacity of the front end, because the tree structures contain meta information substantially in plain text, a large number of such tree structures that can be updated by the back end within seconds can be stored in the memory of the front end.

The dialog predictor regularly updates the tree structure for an ongoing dialog, for example after every dialog step or depending on the situation. Equally, the dialog predictor may also create the tree structure for dialogs that have not yet been initiated by the user but that are likely to take place, or the dialog predictor may access existing tree structures for dialogs of this kind.

By way of example, a request, which can only be reliably granted online, for restaurants near to the current position of the vehicle is given below:

(6) N: "Find an Italian restaurant"

Other search domains could relate to requests for the latest news, e.g.

(7) N: "Who won in the category 'Best actress'?"

The probability that the latter dialog is initiated will increase significantly during and shortly before and after a film award ceremony.

Equally, possible courses of dialog or the associated tree structures may be created on the basis of the previous courses of dialog of the user by means of personalized prediction models. Finally, possible courses of dialog may be determined based on the previous dialogs of a large number of other users, it being possible to constantly update the dialog models.

The generated tree structures are sent from the back end to the front end in the online mode such that they can be used in the offline mode, if necessary.

If the local dialog unit loses the connection to the back end, the local dialog unit immediately switches to the offline mode. Normally, the front end would then be restricted to the embedded capabilities. Therefore, a response to the above-mentioned search request (6) could for example be:

(8) S: "Sorry, the system is currently in offline mode"

Or:

(9) S: "Sorry, I can't search for POIs at the moment"

However, since, according to the present embodiment, a large number of dialog predictions were sent from the back end to the front end while the connection between the back end and front end was still intact, an intermediately stored response that is probably suitable may be provided for the user.

A list of Italian restaurants can thus be provided for the above-mentioned request and the following response may for example be output:

(10) S: "Please select one of the following options"

For example, three options are displayed on a graphical user interface:

1. Pizza Luigi
2. Pasta & more
3. Roma

If the respective addresses of the POIs are transmitted from the back end together with the names of said POIs, it would then be possible, for example, to set one of the three options as the destination for a navigation system.

For example, a method according to the present embodiment is used for vocal assistants in a motor vehicle. Equally, an exemplary method may also be used in vocal assistants of user terminal devices such as mobile devices, tablets, portable computer systems such as so-called wearables or smart home devices, etc.

LIST OF REFERENCE NUMBERS

10 Detection of a dialog input
11 Transmission of the dialog input
12 Reception of a future course of dialog
13 Saving of the received course of dialog
14 Call-up of the saved course of dialog
15 Detection of dialog inputs and output of dialog outputs
20 Reception of a dialog input
21 Calculation of least one future course of dialog
22 Transmission of the at least one future course of dialog
LD Local dialog unit
ED External dialog unit
F Front end
B Back end
MDB Local media database
NDB Navigation database
KF, KB Communication unit
ASRF, ASRB Speech recognition unit
NLUF, NLUB Speech comprehension unit
TTSF, TTSB Speech synthesis unit
L Local logic unit
M Memory unit
DM Dialog manager
DP Dialog predictor The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a dialog system, wherein the dialog system is configured for automated dialog with a user, the dialog system comprising a local dialog unit for detecting dialog inputs of a user and for outputting automated dialog outputs from the dialog system; and an external dialog unit having a data connection to the local dialog unit for analyzing the detected dialog inputs and determining the dialog outputs based thereon, the method comprising by the local dialog unit:

receiving at least one probable future course of dialog prior to an interruption of the Internet connection between the local dialog unit and the external dialog unit, based on a previous automated dialog with the user, which probable future course of dialog is calculated by the external dialog unit and consists of one or more dialog inputs of the user and automated dialog outputs;

saving the received probable future course of dialog;

in case of the interruption of the Internet connection between the local dialog unit and the external dialog unit, retrieving the saved probable future course of dialog; and one or more of detecting dialog inputs of the user and outputting automated dialog outputs based on the retrieved probable future course of dialog during the interruption of the Internet connection.

2. The method of claim 1, comprising:
- detecting a dialog input of a user;
- transmitting the detected dialog input to the external dialog unit.

3. The method of claim 2, wherein, in an online mode, a dialog output generated by the external dialog unit is received and output based on the dialog input detected by the local dialog unit and transmitted to the external dialog unit, and in an offline mode, the probable future course of dialog received from the external dialog unit is retrieved in the local dialog unit.

4. The method of claim 3, wherein the course of dialog received from the external dialog unit is a probable continuation of the previous dialog for the detected dialog input and the previous dialog is continued based on said course of dialog.

5. The method of claim 4, wherein updated versions of the probable future course of dialog are received and saved in the local dialog unit at regular intervals.

6. The method of claim 3, wherein updated versions of the probable future course of dialog are received and saved in the local dialog unit at regular intervals.

7. The method of claim 2, wherein updated versions of the probable future course of dialog are received and saved in the local dialog unit at regular intervals.

8. The method of claim 1, wherein the course of dialog is received before a dialog has been initiated.

9. The method of claim 8, wherein updated versions of the probable future course of dialog are received and saved in the local dialog unit at regular intervals.

10. The method of claim 1, wherein updated versions of the probable future course of dialog are received and saved in the local dialog unit at regular intervals.

11. The method of claim 1, wherein a probable future course of dialog is retrieved from the external dialog unit and saved in the local dialog unit when an interruption to the connection is anticipated.

12. The method of claim 1, wherein the dialog system is designed as a spoken dialog system, in which dialog inputs are formed by of speech recognition and interpretation of spoken inputs of a user and/or dialog outputs formed by speech synthesis.

13. The method of claim 12, wherein the calculated course of dialog, in addition to a probable continuation of the previous dialog for a recognized dialog input, also comprises a probable continuation of the previous dialog for a phonetically similar dialog input.

14. The method of claim 1, wherein the local dialog unit is implemented in a vehicle and the external dialog unit is implemented in a vehicle-external server, which vehicle and server are connected via the Internet.

15. The method of claim 1, wherein the calculated course of dialog is in the form of a hierarchical tree structure.

16. A dialog system, the dialog system being configured for automated dialog with a user, the dialog system comprising:
- a local dialog unit for detecting dialog inputs of a user and for outputting automated dialog outputs; and
- an external dialog unit having an Internet connection to the local dialog unit, being configured for analyzing the detected dialog inputs and determining the dialog outputs based thereon and being furthermore configured to carry out the method of claim 1.

17. A method for controlling a dialog system, wherein the dialog system is configured for automated dialog with a user, the dialog system comprising a local dialog unit for detecting dialog inputs of a user and for outputting automated dialog outputs; and an external dialog unit having an Internet connection to the local dialog unit and being configured for analyzing the detected dialog inputs and determining the dialog outputs based thereon, the method comprising by the external dialog unit:
- receiving a detected dialog input from the local dialog unit;
- calculating at least one probable future course of dialog, based on a previous automated dialog with the user, which at least one probable future course of dialog consists of one or more of dialog inputs of the user and automated dialog outputs;
- transmitting the calculated probable future course of dialog to the local dialog unit prior to an interruption of the Internet connection between the local dialog unit and the external dialog unit; and
- wherein the calculation of the course of dialog based on the received dialog input and the course of dialog is a probable continuation of the previous dialog, so that a dialog can be continued even during the interruption of the Internet connection.

18. The method of claim 17, wherein the course of dialog is calculated before a dialog has been initiated.

19. The method of claim 18, wherein the course of dialog is calculated based on one or more of the following parameters:
- the current location of the local dialog unit;
- the current local time of the local dialog unit;
- information on current political, economic, social, cultural, sports or other events;
- information typically requested by the user; and
- information requested by other users.

* * * * *